United States Patent
Hegler

[11] 3,824,886
[45] July 23, 1974

[54] APPARATUS FOR CUTTING APERTURES IN TUBES

[76] Inventor: Wilhelm Hegler, Goethestr. 2, 873 Bad Kissingen, Germany

[22] Filed: Nov. 3, 1972

[21] Appl. No.: 303,449

[30] Foreign Application Priority Data
June 23, 1972 Germany............................ 2230767

[52] U.S. Cl.......................... 83/329, 83/54, 83/449, 83/490, 83/647.5, 90/11 R, 90/15
[51] Int. Cl............................................... B26d 5/08
[58] Field of Search ............ 83/54, 646, 647.5, 185, 83/187, 490, 483, 329, 449; 90/11 R, 15

[56] References Cited
UNITED STATES PATENTS

| | | | |
|---|---|---|---|
| 1,817,314 | 8/1931 | Hohn | 83/490 X |
| 2,103,486 | 12/1937 | Motch, Jr. et al. | 83/646 X |
| 2,842,238 | 7/1958 | Shaw et al. | 83/490 X |
| 3,370,491 | 2/1968 | Cross | 83/54 X |
| 3,515,190 | 6/1970 | Monuchi | 83/490 X |
| 3,530,915 | 9/1970 | Moriuchi | 83/647.5 X |
| 3,620,115 | 11/1971 | Zieg et al. | 83/54 X |
| 3,703,116 | 11/1972 | Doll | 83/490 X |

Primary Examiner—Frank T. Yost
Attorney, Agent, or Firm—Burgess, Dinklage & Sprung

[57] ABSTRACT

An improved pipe having an incised aperture wherein the length and/or width of the aperture increases from the interior surface of the pipe to the exterior thereof; a process and apparatus for cutting an aperture in the surface of a pipe in which means for revolving a cutter about the pipe to be cut are provided and means for moving the cutting surface in an epitrochoid path as it passes through the exterior surface of said pipe.

11 Claims, 9 Drawing Figures

3,824,886

APPARATUS FOR CUTTING APERTURES IN TUBES

BACKGROUND OF THE INVENTION

1. Field of the Invention

This invention relates to an incised apertured pipe and especially to a method and apparatus for cutting an aperture into the surface of a pipe such as a plastic pipe. More particularly, this invention is directed to a method and apparatus for cutting an aperture in a pipe wherein the cutting means is passed along an epitrochoid path as it passes through an exterior surface of the pipe. This invention is also directed to the pipe so formed which has the length or width of the aperture such that it increases from the interior of the pipe to the exterior thereof. This invention is further directed to apertured pipes having surface corrugations, especially corrugations of multiple helices.

2. Discussion of the Prior Art

Tubes provided with apertures for entry or emergence are often needed, for example, whenever drain pipes are not to be pipes of water-permeable material but plastic pipes. Such pipes are produced at high speed by the machines used for their manufacture, and therefore the problem has to be solved of sawing, punching or cutting the required apertures in these pipes at the same rate of speed.

Solutions to this problem are in the prior art and include cutting the apertures into the tube wall by means of a saw or bur (German Petty Pat. 1,796,170). If the pipes are plain, cylindrical pipes, the tool has to be moved in rapid succession against the tube, so that a high working speed cannot be achieved. If the pipes have a corrugated outer wall, the tube may be passed along a circular saw which produces water entry apertures in the crests of the corrugations (German Petty Pat. 1,829,390). This method of producing the entry apertures has the disadvantage that the apical pressure resistance of the tubes is greatly diminished and that the water entry apertures are located in the peaks of the corrugations rather than in the troughs, which is where they are usually wanted. For the production of water entry apertures in the troughs of the corrugations it is in the prior art to saw slits in the troughs transversely of the longitudinal axis of the tube (German Petty Pat. 1,844,291). This prevents the loss of apical pressure resistance, but the danger of breakage is greater, and in this process, too, the tool has to be moved in rapid succession against the pipe, so that a high working speed cannot be achieved.

It is, furthermore, in the prior art to cut the water entry apertures into the troughs of the corrugations from the inside by means of a tool carried lengthwise through the tube. Aside from the fact that in the case of small-diameter tubes it is difficult to guide or draw the tool through the tube, the chips produced in this process remain inside of the tube. A substantial improvement was achieved by the method of producing knob-like super-elevations during the manufacture of the tube, at the points where the water entry apertures were to be located, these knobs then being cut open by a cutting tool revolving about the pipe (German "Auslegeschrift" 1,459,414). This process has the advantage that a high working speed can be achieved, and that the chips cannot drop into the interior of the pipe. However, it requires especially shaped and therefore expensive molds, and the application of this process involves difficulties when double-walled tubes are involved having a corrugated pipe wall on the outside and a smooth pipe wall on the inside.

It is also prior art to punch the apertures into the pipe wall. See German Offenlegungschrift 1,778,094 and 1,779,579. In this case, however, the punched-out pieces also drop inside of the pipe and often remain adhering to the edge of the punched hole, so that a but develops on whose margins particles may accumulate, resulting in a high resistance to flow. Since the tube wall cannot be supported from within at the point at which it is punched, special guiding means are necessary for the pipe, and the working speed that can be achieved is limited because the punching tool has to be moved against the tool and back again.

SUMMARY OF THE INVENTION

All of the foregoing disadvantages in the prior art apparatus and methods are eliminated by the invention. The invention broadly contemplates a pipe having an incised aperture wherein the length and/or width of the aperture increases from the interior of the pipe to the exterior thereof.

With respect to the apparatus, the invention contemplates an improvement in an apparatus for cutting an aperture in the surface of a pipe which improvement comprises means for revolving a cutter about the pipe to be cut and means for moving the cutting surface in an epitrochoid path as it passes through an exterior surface of said pipe.

In a particularly desirable embodiment the invention contemplates such an improvement where a means is provided to rotate the cutter in a circular path of a circle having a radius which is a simple whole number ratio to the radius of a circle whose center is the center of the pipe and whose circumference coincides tangentially with a point on the circumference of the circle about which the cutter is caused to rotate. Generally speaking, the cutter is disposed on a roller or wheel which rolls about the circumference of the pipe. The cutter is disposed on a cutter head which is positively driven through a transmission to revolve it and the cutter about the pipe.

As indicated above, a preferred embodiment of the present invention is a helical pipe having helical transverse corrugations. In accordance with this invention, there is provided a means for cutting apertures in pipes having helical transverse corrugations in the outer wall wherein the cutter is maintained on a cutter head, which cutter head comprises a wheel having annular grooves corresponding to the profile of the pipe.

In accordance with the invention, the knife which cuts the apertures into the tube wall runs in an epitrochoid about the tube. The epitrochoid is the curve which, as represented in FIG. 1, discussed below, is described by a point P when a circle having the radius r rolls in a slip-free manner on a circle with the radius R and the distance $a$ of the point P from the center of the rolling circle is greater than the radius $r$ of this circle. As FIG. 1 shows, the epitrochoid E forms a loop which dips into the guiding circle having the radius R. If in accordance with the invention a cutting tool is guided in an epitrochoid about the tube, it will cut a piece out of the tube each time that it dips, i.e., when it runs through the small loop, doing so in such a manner that the cutting direction at the end of the cut is outward and therefore the chip also falls outwardly.

In FIG. 1 the radius $r$ of the rolling circle is equal to the radius $R$ of the guiding circle. In this case the epitrochoid forms a loop upon each rotation, i.e., the cutting tool cuts an aperture in one rotation. The radius $r$, however, may also be a multiple of the radius $R$. In this case epitrochoids result which form only one loop during several rotations; for example, when $r = 2 \cdot R$, one loop forms for every two rotations, i.e., the cutting tool cuts only one aperture for every two revolutions, which in many cases is advantageous. The radius $r$, however, may also be smaller than the radius $R$, and in this case several loops are formed in one revolution; e.g., when $3 \cdot r = R$, three loops; that is to say, upon one revolution the cutting tool cuts three apertures into the tube. In order for the apertures produced to be arrayed on a line parallel to the axis it is necessary that the radii be in a simple, whole-number ratio to one another, i.e., that $r/R$ be a simple rational number, i.e., either a low whole number or a fraction of low whole numbers.

In one simple embodiment of the apparatus of the invention, the cutting tools are disposed on a roller or disk rolling on the circumference of the pipe, the axis of rotation of the disk being guided around the pipe and rolling on the circumference of the pipe, and the cutting tools cutting the apertures into the pipe. This embodiment, however, has the disadvantage that slippage takes place between the pipe and the roller or disk, so that, even if allowance is made for this slippage in calculating the radii, there is no assurance that the apertures will be located on lines parallel to the mantle line.

According to the further invention, therefore, the cutters are disposed on a cutterhead which is positively driven through a transmission so as to revolve around the pipe while rotating. It is desirable that this cutterhead be driven by a pinion which is driven through additional gears the first of which rolls on a stationary gear.

If the apertures are to be cut into a pipe whose outer wall is provided in known manner with helical corrugations, the cutterhead may be a wheel which is provided with annular grooves corresponding to the profile of the pipe. This brings it about that the apertures cut into the pipe will have the same spacing in the longitudinal direction.

One or more cutters can be provided on the cutterhead. The cutters fastened to the cutterhead can advantageously be in the form of circular disks with recesses forming the cutting edges. So that these cutters will always assume the correct position on the cutterhead, additional recesses may be provided for the purpose of fixing the position of the cutter. To allow for the fact that, when the cutter is resharpened, the cutting edge will recede, a plurality of saw-tooth-shaped recesses may be provided, in which case, after each regrinding, the next succeeding recess serves to fix the cutter position.

To prevent the pipe from yielding laterally from the cut when the apertures are incised, especially when the cutting tool begins to get dull, it is desirable to provide one or more supporting rolls which rotate with the cutterhead and center the pipe in the cutting apparatus. Since the incision of the apertures additionally exerts a tangential force on the pipe, which seeks to rotate the pipe, a plurality of resilient rolls may additionally be provided on the stationary housing, for the guidance of the pipe, with their axes perpendicular to the pipe axis.

One special advantage of the apparatus of the invention also lies in the fact that the apertures incised into the pipe flare outwardly in the longitudinal direction, i.e., the length of the apertures increases outwardly. Since it has proven to be advantageous in drain pipes for the water entry apertures to taper inwardly, the cutters may be shaped so that even the width of the apertures increases outwardly, thereby achieving a low resistance to the entry of water. Such shaping of the water entry apertures is impossible in the case of sawing and punching, and in the case where the apertures are cut into superelevations it is possible to only an incomplete extent.

The apparatus of the invention also has the additional advantage that it is possible, by appropriately selecting the epitrochoid in which the cutter moves, and through the use of a plurality of knives offset from one another, to cut apertures offset from one another into the troughs or into the peaks of the corrugations. With the same means it is also possible to produce the entry apertures on only one part of the circumference and thereby to produce a pipe which may be laid so that water entry apertures are on the bottom side only or on the top side only.

BRIEF DESCRIPTION OF DRAWINGS

In the accompanying drawings which show an embodiment of the apparatus of the invention, pipes made therefrom, and the epitrochoid configuration.

DESCRIPTION OF SPECIFIC EMBODIMENTS

Figure 1:
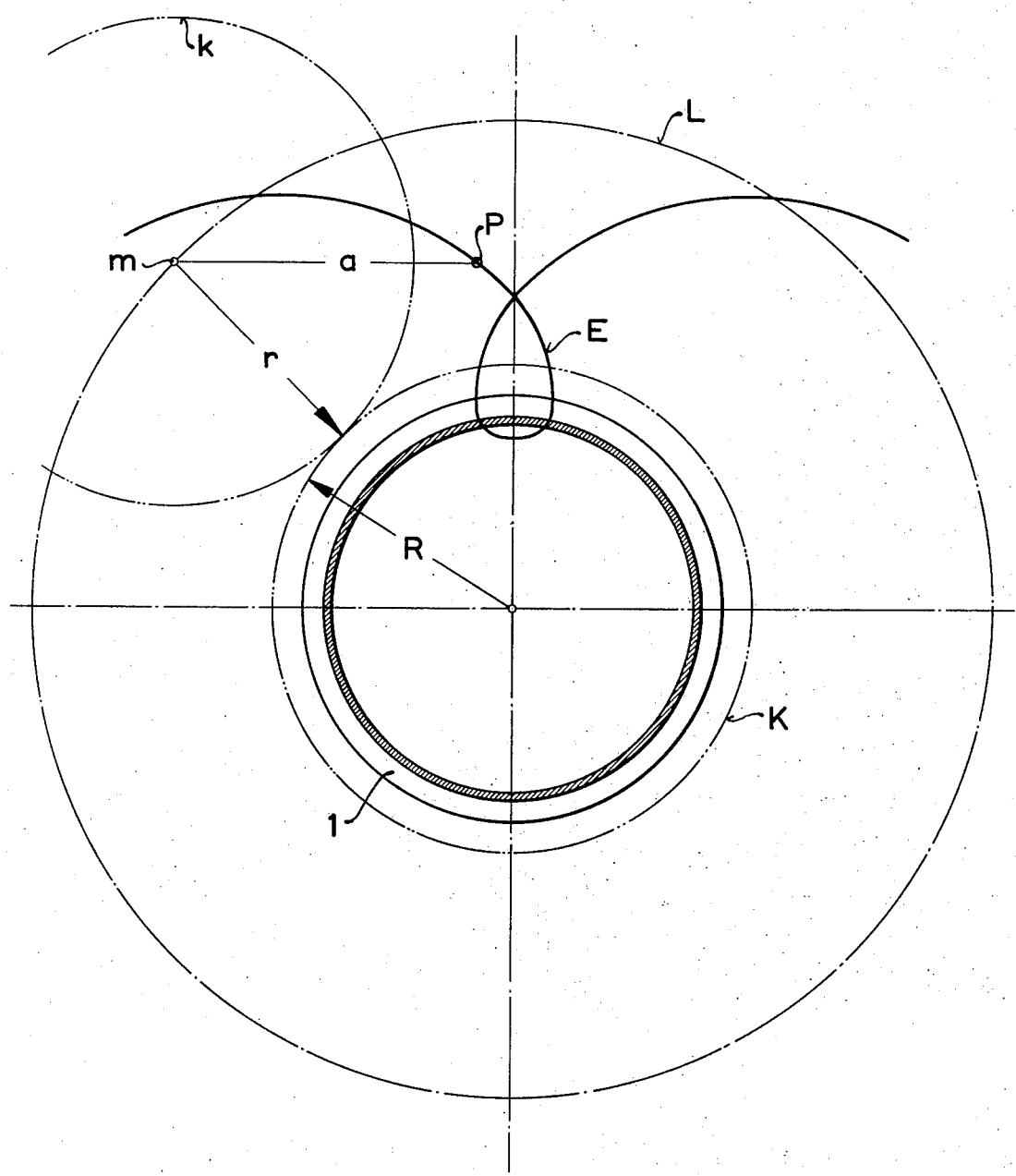
FIG. 1 shows diagramatically the positioning of the revolving cutter with respect to the pipe and the circle defined by having its center the center of the pipe and tangentially coinciding with a point on the circumference of the circle about which the cutter is caused to rotate. This figure shows diagramatically the basic principle of the apparatus of the invention.

FIG. 1 has already been explained above in the course of explaining the cutter movement on an epitrochoid. A cutter moving on the epitrochoid E cuts an aperture into the wall 1 of a pipe. The outside of the pipe 1 must not coincide with the guiding circle $K$. The inside or outside radius of the pipe 1 can be slightly smaller than the radius $R$ of the guiding circle $K$. The only requirement is that the distance $a$ between the point P corresponding to the cutting edge of the cutting tool and the center $m$ of the rolling circle $k$ be great enough so that the loop of the epitrochoid intersects the pipe wall 1 at two points close to one another. In the rolling movement, the center m of the rolling circle $k$ moves along the circle L.

In the apparatus represented in FIGS. 2 and 3, a stationary, i.e., non-rotating, housing 2 bears a likewise stationary gear 3 hereinafter referred to as the sun gear. A hollow shaft 5, onto which a driving flange 6 is threaded, is rotatably mounted in housing 2 by means of a ball bearing 4. Through the hollow shaft 5 runs the pipe 7 into which the apertures are to be cut. The pairs of planet gears 8, 9 and 10, 11, are rotatably mounted in the driving flange 6, gears 8 and 9 being mounted on a shaft and the planet gear 8 meshing with the sun gear 3. Planet gears 10 and 11 are likewise on a common shaft and the gear 10 is driven by the gear 9, while gear 11 meshes with a driving gear 12 on whose shaft the tool holder 13, 14, 15 is disposed. When the driving flange 6 rotates, the tool holder 13-14-15 revolves in the same direction and the transmission ratio is selected such that during one revolution about the pipe 7, i.e., during one revolution of the drive flange 6, the tool holder will perform one revolution against the latter. As it can easily be seen, this causes the cutter edges 17 of the cutter 16 to move on epitrochoids, the loop of the epitrochoid E of the cutter, which cuts just into the pipe, being indicated in FIG. 2.

Figure 2:
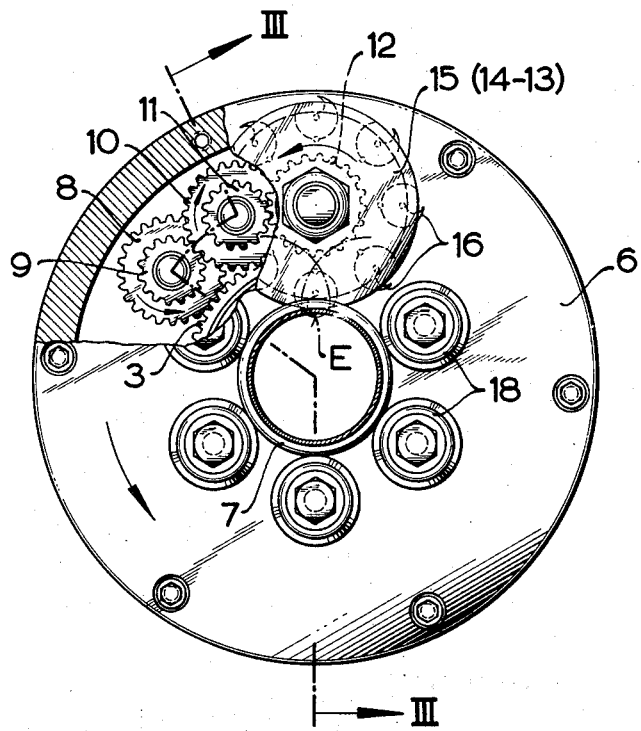
FIG. 2 is a partially cut-away front elevation of an apparatus in accordance with the invention.
Figure 3:
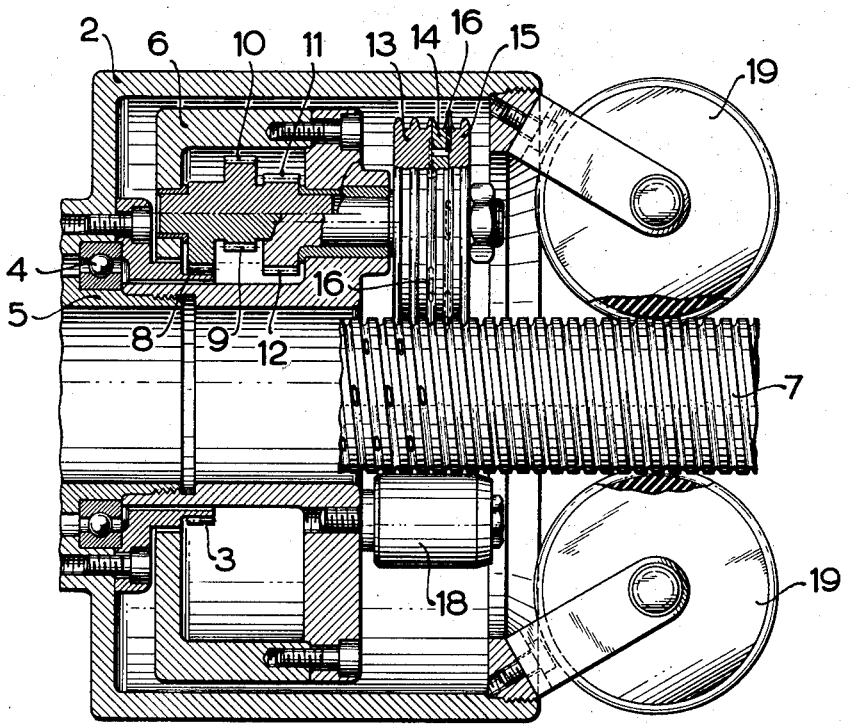
FIG. 3 is an apparatus of FIG. 2 in a cross section taken along line III—III of FIG. 2.

From FIGS. 2 and 3, it is seen that motion is imparted to the tool holder 13-14-15 by initially revolving the driven flange 6 which moves about the sun gear 3 which is stationary. This motion, in turn effects movement of the larger planet gear 8 which meshes with sun gear 3. The smaller planet gear 9, which is concentric with planet gear 8, engages an adjoining planet gear 10 to impart motion thereto. Concentric with planet gear 10 is a smaller planet gear 11. It should be understood that planet gear 11 has a smaller diameter than planet gear 10, just as planet gear 9 has a smaller diameter than planet gear 8. Planet gear 11, in turn, moves on a driven gear 12 on whose shaft the tool holder 13, 14 and 15 is disposed.

In order to achieve the 1 : 1 transmission ratio which is assumed here, and with which each cutter will make one cut upon each rotation of the cutterhead, the numbers of the teeth in the gears must satisfy the following equation:

$$Z_3 \times Z_9 \times Z_{11}/Z_8 \times Z_{10} \times Z_{12} = 1/1$$

$Z$ = the teeth on the particular gear. If the gear transmission ratio is not precisely 1 : 1, but slightly greater or slightly less, the cut apertures will not be located on a line parallel to the axis but on a line spiralling to the left or right, which under certain circumstances may even be desirable for drain pipes. The transmission ratio, however, may also be made 1 : 2, for example, if each tool is to cut into the pipe only upon every second revolution. In this case the equation must have a value of ½.

In the embodiment of FIGS. 2 and 3, it is assumed that entry apertures are to be cut into the troughs of both spirals of a drain pipe whose transversely corrugated outer wall is in the form of a double spiral. The cutterhead consists of three parts and has a total of four guiding grooves matching in profile four of the crests of the corrugations of the drain pipe 7. Part 13 of the cutterhead serves for guidance and is not equipped with cutters. Four cutters 16 are fastened to each of parts 14 and 15, so that in one revolution four apertures are cut into each trough of the corrugations of the pipe. The grooves in part 13 may serve not only for guidance but also for the purpose of removing any chips that might not be completely severed. To improve this action, suitable teeth may be cut at those areas which run over the apertures as the cutterhead continues to spin.

In order that pipe 7 may be precisely centered while the apertures are being cut, a plurality of supporting rolls 18 are also provided on the drive flange 6, and they rotate about the tube with the driving flange and produce a pressure to counter the pressure of the cutterhead and cutters.

The axes of rotation of rollers 18 and of the cutterhead 13-14-15 are shown parallel to the axis of rotation of the driving flange 6 in FIGS. 2 and 3. However, to allow for the feed of pipe 7, these axes of rotation must be slightly canted so that the rolling movement corresponds to the pitch of the helical transverse corrugations of pipe 7.

Due to the cutting pressure of the cutters, and to the fact that the circumferential velocity of the cutterhead is somewhat greater than would correspond to a mere rolling movement against pipe 7, a torque is exerted on pipe 7, especially when the cutters begin to get dull resulting in an increase in the cutting pressure. To counteract this torque, guiding rolls 19 may be provided on the stationary housing 2 which are advantageously provided with a resilient surface and a high friction resistance, e.g., are covered with rubber, and which are urged against pipe 7 by a spring which is not shown. The axes of rotation of these guiding rolls 19 are perpendicular to the axis of the pipe 7, although, if desired, they may be slightly canted so as to produce a torque opposing the torque that is exercised on the pipe by the rotating cutting system.

Figure 4:
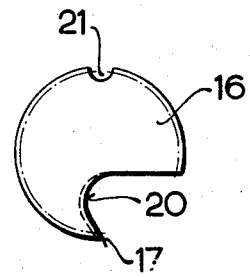
FIG. 4 shows a single cutter of the apparatus of FIGS. 2 and 3.

The cutters 16 are advantageously made in the shape represented in FIG. 4, each cutter being formed from a disk into which an approximately semicircular recess 20 is ground, so that the cutting edge 17 is formed. A second recess 21 serves to affix the cutter 16 to the cutter holders 14–15. Instead of this recess 21, a plurality of saw-toothed recesses may be provided, and after each regrinding of the cutter, which is performed such that the cutting edge 17 is set back by a precisely defined amount, the cutter is shifted to the next tooth, so that the cutting edge will always assume the same position in relation to the cutter holder.

Figure 5:
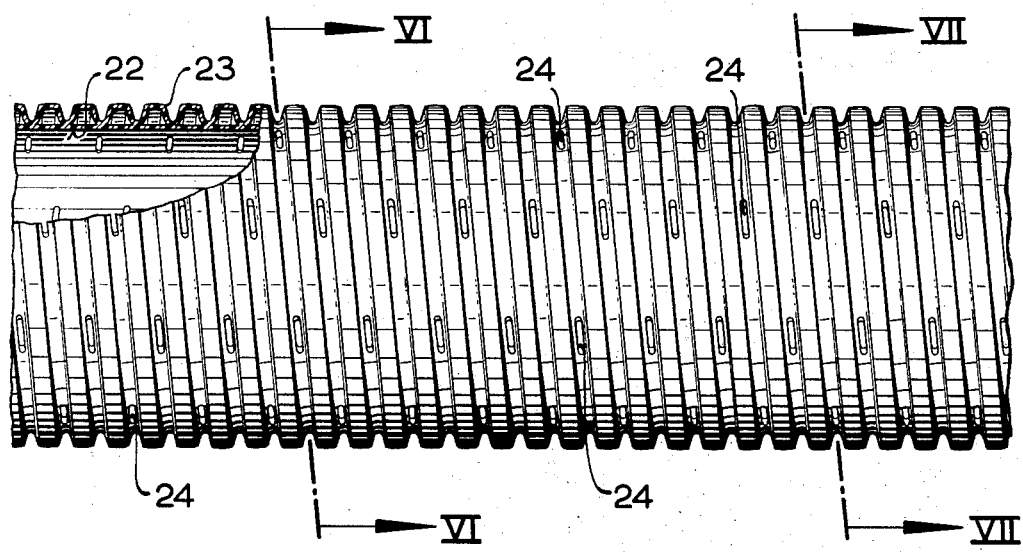
FIG. 5 shows a double-walled transversely corrugated pipe in a side elevation, cut-away at the left end, into which apertures are cut with an apparatus of the invention.
Figure 6:
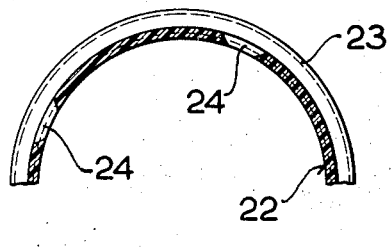
FIG. 6 is a partial cross section of the pipe of FIG. 5, taken along the line VI—VI of FIG. 5.
Figure 7:
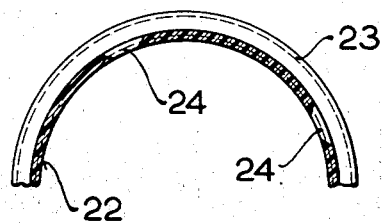
FIG. 7 is a partial cross section taken along the lines VII—VII of FIG. 5.

FIG. 5 shows a drain pipe with apertures cut in accordance with the invention. The drain pipe represented in a double-walled tube consisting of a plain inner wall 22 and a transversely corrugated outer wall 23, the transverse corrugations forming a double spiral. Four entry apertures 24 are cut into each turn of both spirals. The entry apertures in the two spirals are offset from one another, and flare outwardly in the longitudinal direction, as best seen in FIGS. 6 and 7. If a cutter 16 is used which is bevel-ground at the sides, the entry apertures may also be made to taper inwardly at their sides as well as at their ends, thereby diminishing resistance to the entry of water.

Figure 8:
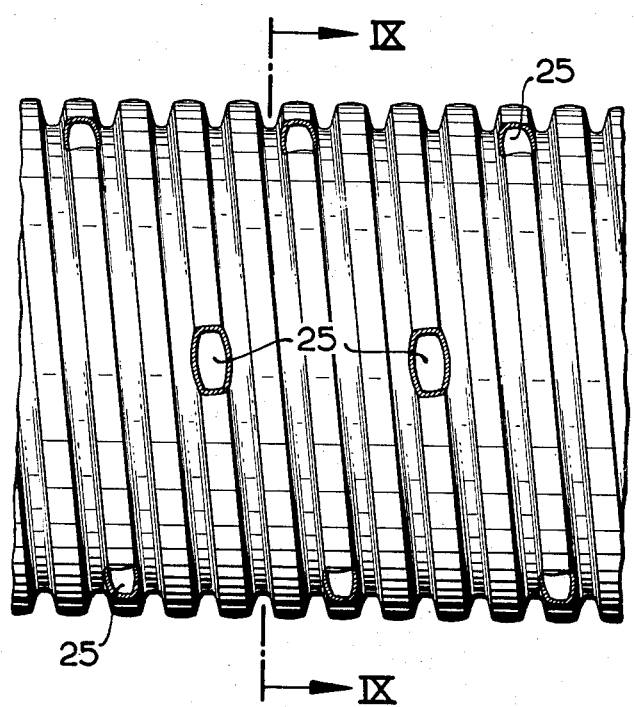
FIG. 8 is a side elevational view of a pipe in which large entry apertures are cut into the crests of the corrugations.
Figure 9:
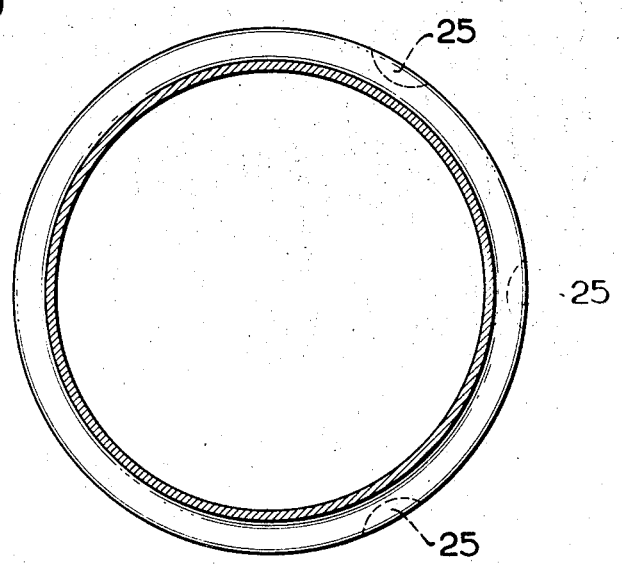
FIG. 9 is a cross sectional view taken along the line IX—IX of the pipe of FIG. 8.

Whereas it is usually preferred in the case of drainage pipes to have entry apertures in the troughs of the corrugations, it is desired in many special cases - as for example for the dispersal of black water - to cut apertures as large as possible in the crests of the corrugations. Such a pipe is represented in FIGS. 8 and 9. This, again, is a pipe with a transversely corrugated outer wall, in which the transverse corrugations form a double helix, but the water entry apertures 25, which here are very wide, are cut into only the one helix, into the crest thereof. This can easily be achieved with an apparatus in accordance with FIGS. 2 and 3, if a cutterhead is used in which the cutters are provided in the grooves thereof, and only in the grooves associated with the one helix. In this embodiment, provision is furthermore made so that the entry apertures are not uniformly distributed over the circumference of the tube but are located only on the right side in FIG. 9. It is assumed that the arrangement of the entry apertures is such that the entry apertures located on the same mantle line always skip one turn of their associated spiral, i.e., are cut only in the course of every other revolution. To accomplish this an arrangement similar to the one in FIGS. 2 and 3, except that the cutterhead is driven in such a manner that it performs only one revolution relative to the drive flange for every two revolutions of the said drive flange 6.

The examples show that the apparatus of the invention can easily be adapted to a variety of requirements, and that it is possible to cut the apertures in virtually any desired arrangement. When the apertures are cut, the chips fall outwardly and can be caught in the housing 2 and continuously removed from the housing by an apparatus which is not shown, for the purpose of recycling them to the manufacturing process. The apparatus of the invention can be used not only for transversely corrugated pipes, but also for all forms of pipe having a circular cross section, particularly plain pipes, and it is suitable not only for cutting water entry apertures in plastic pipes, but also in pipes of any other cuttable material, and it permits a high working speed since it contains no reciprocated parts but only rotating parts. The pipes into which apertures are to be cut, may consist of polyvinylchloride (PVC) or of polyethylene or other similar plastics. Without difficulties in cutting the apertures the wall thickness of the pipes may amount to 1/8 inch and more by pipes of polyethylene and to about 1/16 inch by pipes of PVC.

What is claimed is:

1. In an apparatus for cutting discontinuous apertures in the surface of a pipe, the improvement which comprises a means for revolving a cutter about axially moving pipe to be cut and means for moving the cutting surface in an epitrochoid path as it passes, on a first pass, through an exterior surface of said pipe and into the hollow therewithin to form an aperture in the surface of said pipe.

2. An improvement according to claim 1 wherein means are provided to rotate said cutter in a circular path of a circle having a radius which is a simple whole number ratio to the radius of a circle whose center is the center of said pipe and whose circumference coincides longitudinally with a point on the circumference of the circle about which said cutter is caused to rotate.

3. An improvement according to claim 2 wherein said cutter is disposed on a roller or wheel which rolls upon the circumference of said pipe.

4. An improvement according to claim 1 wherein the cutter is disposed on a cutter head which is positively driven through a transmission to revolve it and said cutter about said pipe.

5. An improvement according to claim 4 wherein said cutterhead is driven by a pinion which, in turn, is driven by a series of interconnecting, movable gears, the gear most remote from said cutterhead rolling upon a stationary gear.

6. An improvement according to claim 1 for cutting apertures in pipes having helical transverse corrugations in the outer wall wherein said cutter is maintained on a cutterhead comprising a wheel having annular grooves corresponding to the profile of said pipe.

7. An improvement according to claim 1 wherein said cutter is in the form of a circular disk having a recess to define a cutting surface.

8. An improvement according to claim 7 wherein said circular disc has an additional recess for fixing the position of the cutter.

9. An improvement according to claim 7 wherein said cutter has a plurality of recesses saw-tooth-wise for fixing the position of the cutter.

10. An improvement according to claim 3 where there are a plurality of supporting rotatable rolls which support said pipe and rotate with a cutterhead about said pipe.

11. An improvement according to claim 10 wherein there are a plurality of resilient rollers guiding the pipe on a stationary side of the apparatus upstream of said cutterhead.

* * * * *